(12) United States Patent
Reed et al.

(10) Patent No.: US 11,465,310 B2
(45) Date of Patent: Oct. 11, 2022

(54) CONFIGURABLE FEEDSTOCK MEASUREMENT DEVICE

(71) Applicant: Reekon Tools, Inc., East Boston, MA (US)

(72) Inventors: Christian Reed, Chelsea, MA (US); Konstantinos Oikonomopoulos, Boston, MA (US)

(73) Assignee: Reekon Tools, Inc., East Boston, MA (US)

( * ) Notice: Subject to any disclaimer, the term of this patent is extended or adjusted under 35 U.S.C. 154(b) by 297 days.

(21) Appl. No.: 16/859,098

(22) Filed: Apr. 27, 2020

(65) Prior Publication Data
US 2021/0331345 A1  Oct. 28, 2021

(51) Int. Cl.
*B26D 7/28* (2006.01)
*B26D 5/24* (2006.01)
(Continued)

(52) U.S. Cl.
CPC ............... *B26D 7/28* (2013.01); *B26D 5/24* (2013.01); *G01B 3/12* (2013.01); *G01B 5/043* (2013.01)

(58) Field of Classification Search
CPC . B26D 7/28; B26D 5/24; G01B 5/043; G01B 3/12; G01B 3/1041; G01B 3/1092;
(Continued)

(56) References Cited

U.S. PATENT DOCUMENTS 2,697,281 A * 12/1954 Watson ............... G01B 7/107
                                                     33/DIG. 1
3,688,410 A *  9/1972 Zeidler ............ G01D 5/34738
                                                      33/773
(Continued)

FOREIGN PATENT DOCUMENTS

KR      19990013544 U    4/1999
KR        200206019 Y1   3/2001
(Continued)

OTHER PUBLICATIONS

International Searching Authority—International Search Report, pertaining to International Application No. PCT/US2021/029100, dated Nov. 4, 2021, together with the Written Opinion of the International Searching Authority, 9 pages.

*Primary Examiner* — Ghassem Alie
(74) *Attorney, Agent, or Firm* — Sunstein LLP (57) ABSTRACT

In accordance with one embodiment of the present invention, there is provided a device for measuring length of feedstock being fed to a tool operated directly by a user. The device includes a body, configured to be removably attached to the tool. The device also includes a display, mounted in the body, and visually accessible to the user. The device also includes a measurement wheel mechanically mounted to the body and configured to be mechanically biased to the feedstock under a condition wherein the body is attached to the tool. The device also includes an encoder coupled to the measurement wheel and configured to generate a signal indicative of angular position of the wheel. The device (Continued)

further includes a processor, disposed in the body, coupled to the encoder and the display and configured to cause the display to show a measure indicative of a length of the feedstock that has been fed to the tool.

8 Claims, 13 Drawing Sheets

(51) Int. Cl.
    *G01B 3/12*       (2006.01)
    *G01B 5/04*       (2006.01)

(58) Field of Classification Search
    CPC .......... G01B 11/026; G01B 3/10; G01B 5/02; G01S 17/08; G01C 3/00
    USPC ......... 33/773, 772, 760, 776, 707, 775, 779, 33/780, 781, 782, 121, 124, 533
    See application file for complete search history.

(56) References Cited

U.S. PATENT DOCUMENTS

| | | | |
|---|---|---|---|
| 4,394,740 A * | 7/1983 | Shalon | G06Q 30/0284 33/735 |
| 5,561,251 A | 10/1996 | Greminger et al. | |
| 6,157,369 A * | 12/2000 | Merminod | G06F 3/0312 345/157 |
| 7,165,338 B2 * | 1/2007 | Clifton | B27B 27/04 33/630 |
| 8,220,374 B2 * | 7/2012 | Wang | B27B 27/10 83/435.15 |
| 2006/0010706 A1 * | 1/2006 | Williams | G01B 3/12 33/772 |
| 2009/0150117 A1 * | 6/2009 | Krasuski | G07B 17/00661 702/170 |
| 2010/0064869 A1 | 3/2010 | Poole | |
| 2018/0311751 A1 | 11/2018 | Mayer et al. | |

FOREIGN PATENT DOCUMENTS

| | | |
|---|---|---|
| KR | 20140002808 U | 5/2014 |
| KR | 1020190064731 | 6/2019 |

* cited by examiner

CONFIGURABLE FEEDSTOCK MEASUREMENT DEVICE

TECHNICAL FIELD

The present invention relates to measurement devices, and more particularly to configurable feedstock measurement devices for measuring length of feedstock being fed to a tool operated directly by a user.

BACKGROUND ART

Determining exactly where along a length of material a cut is to be made by a tool in order to arrive at a desired length of material has always posed a challenge to the craftsman. The challenge arises because a cutting tool invariably produces a cut having some width, which must be considered in estimating the resulting length of material after the cut has been made. Moreover, traditional feedstock measuring techniques, such as the use of a measuring tape, often involve marking of the feedstock before cutting which adds delays to the measurement and cutting process.

SUMMARY OF THE EMBODIMENTS

In accordance with one embodiment of the present invention, there is provided a device for measuring length of feedstock being fed to a tool operated directly by a user. The device includes a body, configured to be removably attached to the tool. The device also includes a display, mounted in the body, and visually accessible to the user. The device also includes a measurement wheel mechanically mounted to the body and configured to be mechanically biased to the feedstock under a condition wherein the body is attached to the tool. The device also includes an encoder coupled to the measurement wheel and configured to generate a signal indicative of angular position of the wheel. The device further includes a processor, disposed in the body, coupled to the encoder and the display and configured to cause the display to show a measure indicative of a length of the feedstock that has been fed to the tool.

In a further related embodiment, the device includes a pivot arm, configured to be mounted to the body, at a pivot, at a first end of the pivot arm, and a pivot arm spring mounted in relation to both the pivot arm and the body to bias the pivot arm in a manner as to maintain the measurement wheel engaged against the feedstock.

Optionally, the pivot arm has a second position in which the measurement wheel is not engaged against the feedstock, and the device further comprises a releasable latch configured to releasably latch the pivot arm in the second position.

In another related embodiment, the device includes a storage system, coupled to the processor, and configured to store parameter data relating to the tool, and further includes a zeroing button, coupled to the processor. The zeroing button is configured by the processor, under a condition wherein the feedstock has abutted a blade of the tool, to reset the measure in the display to facilitate determination of the length of the feedstock thereafter fed to the tool.

In a further related embodiment, the storage system is configured to store a quantity corresponding to thickness of a blade in the tool, and the zeroing button is configured by the processor to reset the measure in the display to a negative offset corresponding to the stored quantity. Optionally, the negative offset is user-configurable.

In another related embodiment, the device includes a clamp, coupled to the body, configured to removably attach the body to the tool.

In another related embodiment, the clamp is configured to mount the body on an approximately vertical member of the tool, the clamp including a clamp handle pivotally attached to the body, a linkage system coupled to the clamp handle and including a set of clamp arms, a set of clamp feet pivotally attached to the set of clamp arms and configured, in response to a downward force applied to the clamp handle, to compressively engage the vertical member against a contact surface of the body, so that the vertical member is clamped between the set of clamp feet and the contact surface of the body.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

The term "feedstock" means any material that is being fed to a tool for physical processing.

An "encoder" is a device that generates an electrical signal indicative of angular position of a rotating member.

A "set" includes at least one member.

A "storage system" is an arrangement coupled to a processor for storing digital data, the arrangement including a member selected from the group consisting of volatile memory, non-volatile memory, and combinations thereof.

A "zeroing button" is a button, accessible to a user, and coupled to a processor used in a device for measuring length of feedstock being fed to a tool operated directly by a user. When the feedstock has abutted a blade of the tool, the button is configured by the processor to reset the measure in the display to facilitate determination of the length of the feedstock thereafter fed to the tool. The zeroing button may be implemented as a member selected from the group consisting of a switch mounted in the body, a soft button in a touch display, and combinations thereof.

A "vertical member" of a tool used for processing of feedstock is a member having a generally vertical orientation when the tool is in use and on which an embodiment of the present invention can be mounted; in some applications, the vertical member may serve as a guide for the feedstock.

Figure 1:
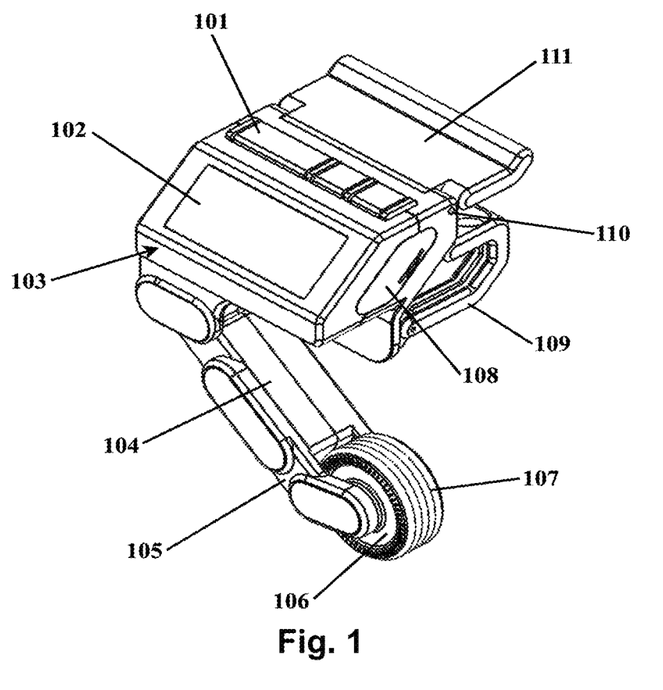
FIG. 1 is a perspective view, seen from the right upper side, of an embodiment of a configurable feedstock measurement device, in accordance with the present invention, in this case with the pivot arm extended.

FIG. 1 is a perspective view, seen from the right upper side, of an embodiment of a configurable feedstock measurement device, in accordance with the present invention, in this case with pivot arm 104 extended, so that the measurement wheel 107 can engage against an item of feedstock when the feedstock is presented for processing by the tool. The body 103 has a clamping mechanism including a clamp handle 111 and a clamp arm 109. The clamp handle 111 is pivotally mounted, via clamp pivot 110, to the body 103 and is also coupled to the clamp arm 109. The pivot arm 104 is also attached to the body 103 and pivots about a point on the body 103. The pivot arm 104 mounts a measurement wheel 106, which has a wheel tread 107 to engage against an item of feedstock when present. The measurement wheel 106 may be taken off the device for replacement by removing the removable wheel retention cover 105. In various embodiments, the device is powered by a battery accessible via battery cover 108. Functions of the device may be selected and used by activating buttons 101. A series of information, useful to the function of the device and to the user, may be viewed on the integrated display 102, which is mounted on the body 103.

Figure 2:
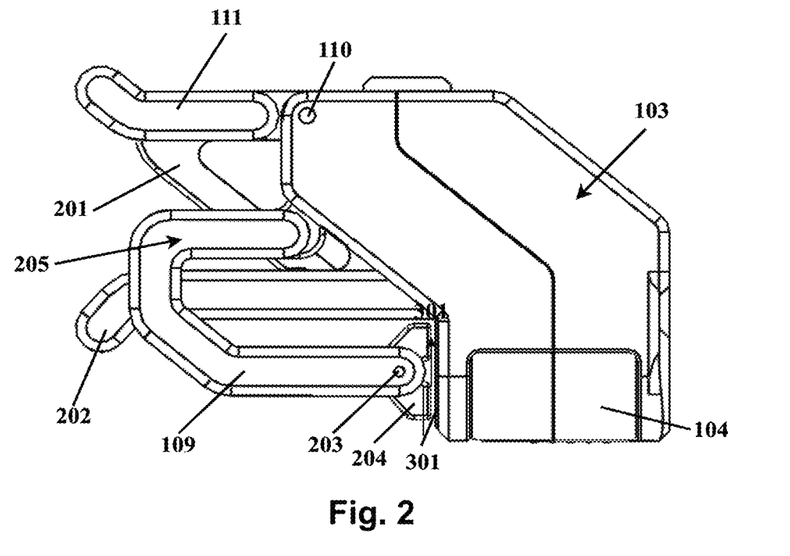
FIG. 2 is a side view, seen from the left side, of an embodiment of FIG. 1, in this case with the pivot arm retracted.
Figure 6:
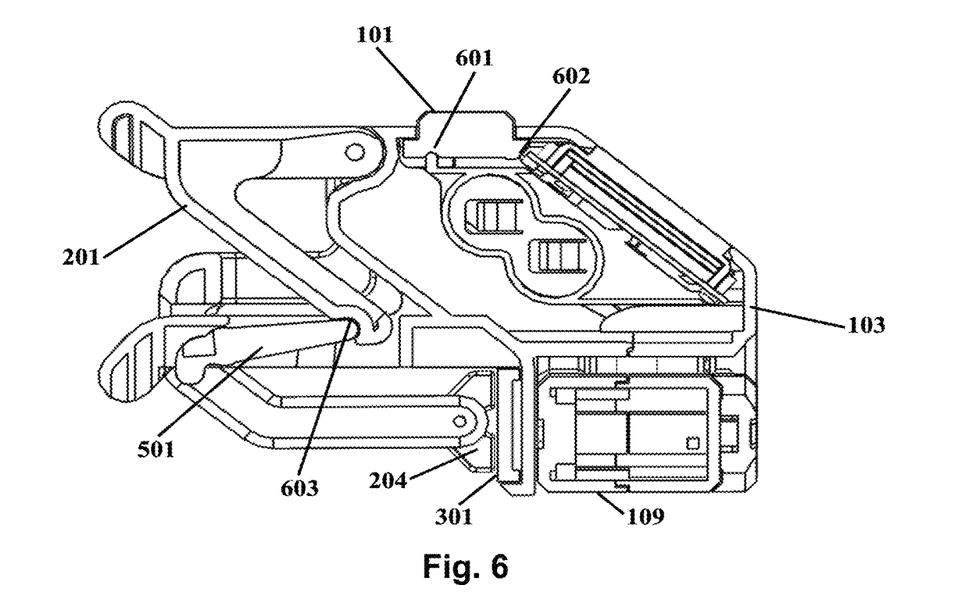
FIG. 6 is a cross sectional view into the left side of the embodiment of FIG. 1, showing configuration of the clamping mechanism among other features.

FIG. 2 is a side view, seen from the left side, of the embodiment of FIG. 1, in this case with the pivot arm 104 retracted. The device of this embodiment includes a clamp system, designed to removably clamp the device to a vertical member of the tool with which the device is used, and to accommodate a range of shapes and geometries of the vertical member. The clamp system includes clamp handle 111, rigid angled bracket 201, clamp arm 109, and clamp feet 204. The clamp handle 111 is pivotally attached to the body 103 to effectuate clamping of the device to the vertical member. The clamp handle 111 includes a rigid angled bracket 201 that is coupled to the clamp arm 109, which, in turn, mounts a set of clamp feet 204, which engage against a face of the vertical member associated with the tool to which the device is attached. The vertical member is squeezed between the clamp feet 204 and an anvil formed by a portion of the body 103. When the clamp handle 111 is lowered, the squeezing latch 202 secures the clamp 205 in a locked position. As shown in FIG. 6, the locked position is maintained by latching of the tip of pawl 501 in a corresponding recess 603 of the rigid angled bracket 201. On the ends of the clamp arm 109, there are clamp feet 204, which are free to pivot about the clamp feet pivot point 203 and make contact with the tool that the device is clamped to.

Figure 3:
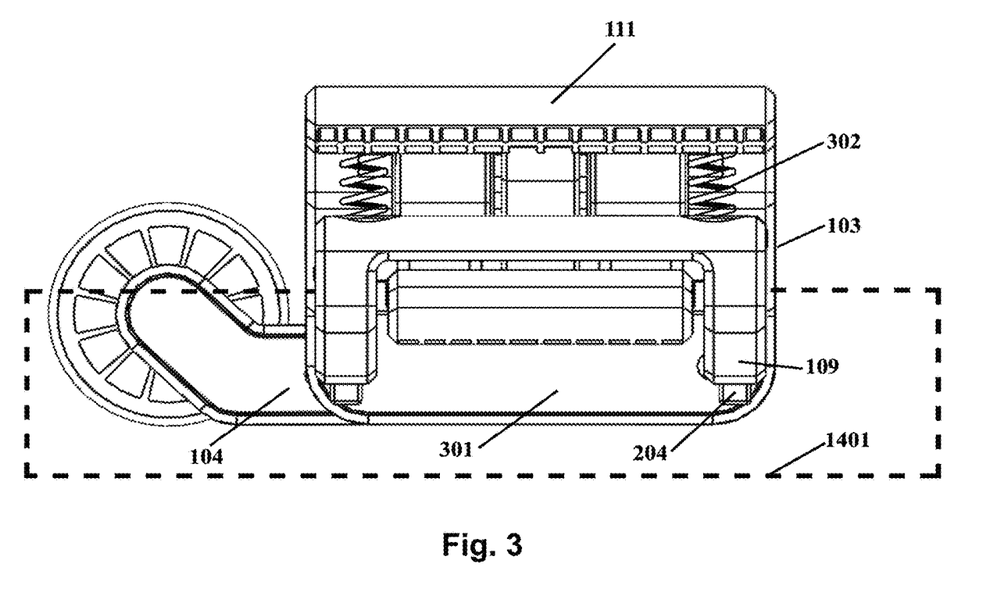
FIG. 3 is a rear view of an embodiment of FIG. 1, in this case with the pivot arm retracted.

FIG. 3 is a rear view of an embodiment of FIG. 1, in this case with pivot arm 104 retracted. The vertical member of the tool to which the device is mounted is squeezed by the clamp arrangement between anvil surface 301 of body 103 and the clamp feet 204. The force generating springs 302 are constrained between the clamp handle 111 and clamp arm 109 and transmit force, through the clamp arm 109 and feet 204, to secure the body 103 to the tool.

Figure 4:
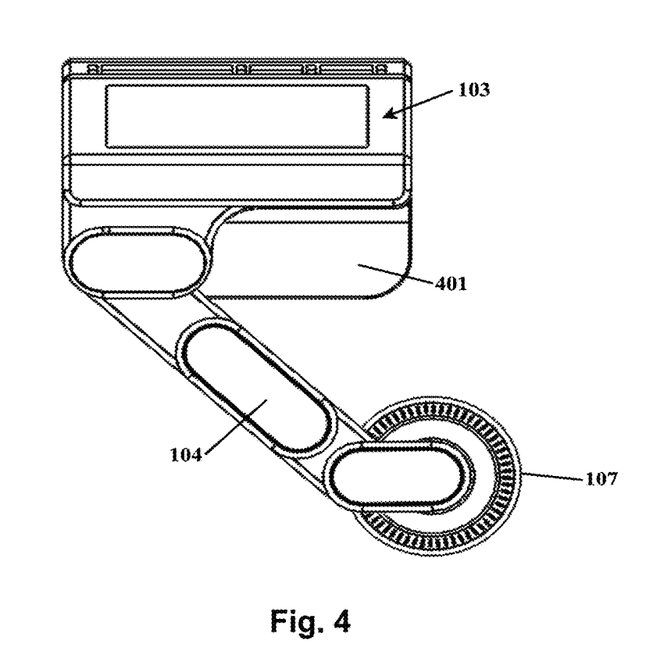
FIG. 4 is a front view of the embodiment of FIG. 1, with the pivot arm in an extended position.

FIG. 4 is a front view of the embodiment of FIG. 1, with the pivot arm 104 in an extended position. When pivot arm 104 is retracted, it resides in the pivot arm storage cutout 401 formed in the body 103 so as to protect the pivot arm in that position.

Figure 5:
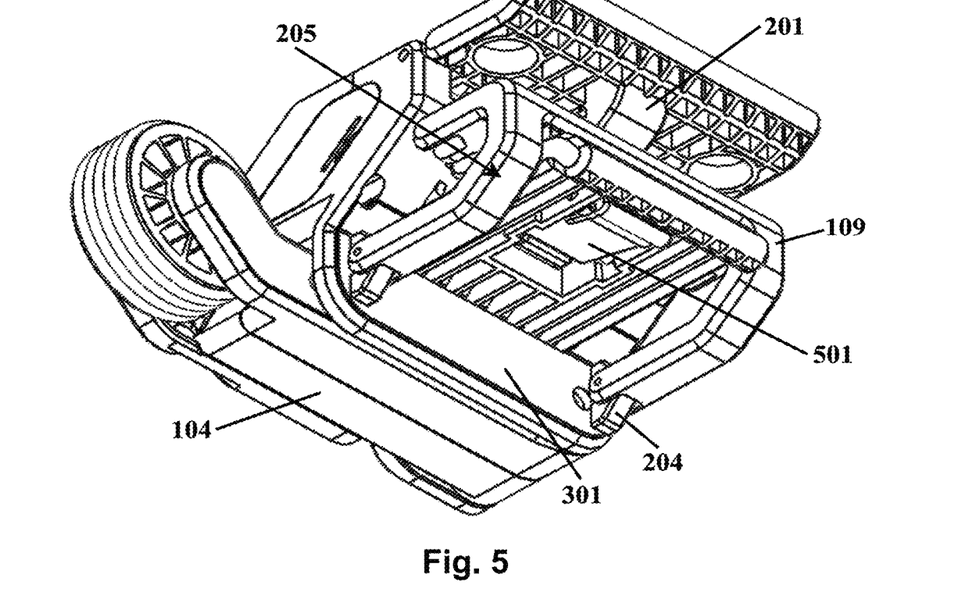
FIG. 5 is a perspective view, from the left underside, of the embodiment of FIG. 1, highlighting the clamping mechanism and retention latch.

FIG. 5 is a perspective view, from the left underside, of the embodiment of FIG. 1, highlighting the clamping mechanism and retention latch. The pawl 501 is shown on the bottom side of FIG. 5. The pawl 501 couples with the rigid angled bracket 201 to lock the clamp 205 in place, until the pawl 501 is depressed by the user, thereby releasing the clamping force generated by force generating springs 302.

FIG. 6 is a cross sectional view into the left side of the embodiment of FIG. 1, showing configuration of the clamping mechanism among other features. The pawl 501 meets the rigid angled bracket 201 at the clamp arm protrusion retention notch 603 which ensures it is secured in place in the clamped position. The input buttons 101, which are housed in the body 103, can be made in a single piece and pivot about the button pivot surface 601 with the button trigger surface 602 used for engaging an external part as a response to the buttons 101 being depressed.

Figure 7:
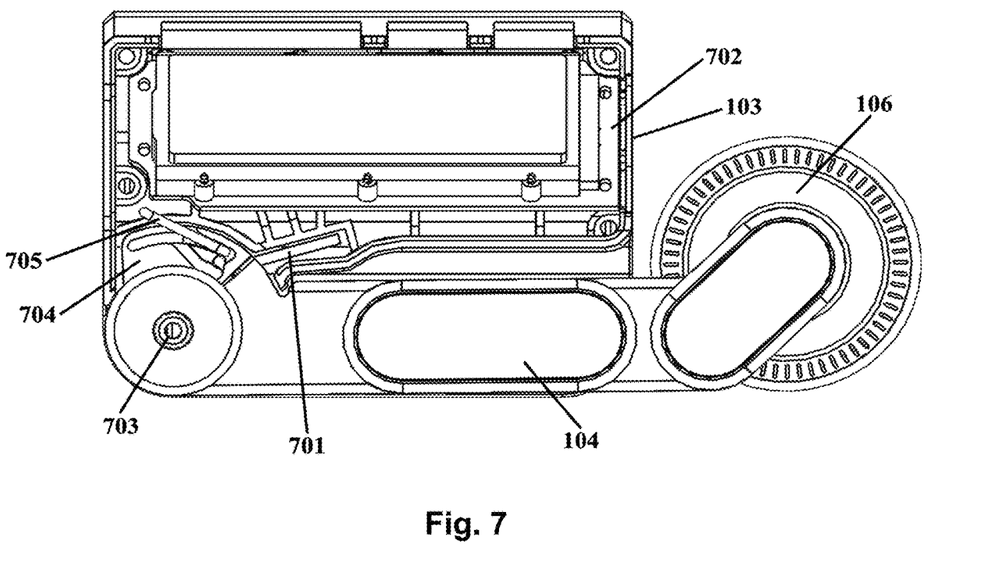
FIG. 7 is a front view of the body of the embodiment of FIG. 1, with a portion of the front removed and the pivot arm in a retracted position.

FIG. 7 is a front view of the body 103 of the embodiment of FIG. 1, with a portion of the front removed and the pivot arm 104 in a retracted position. The processor 702 is contained within the body 103 and controls much of the electrical input and outputs of the device. A pivot arm spring 701 is located between the body 103 and the pivot arm 104 and provides the pivot arm 104 with downward force when engaged and allows the wheel to become biased against feedstock. The pivot arm 104 rotates about the pivot arm pivot 703 located within the body 103 assembly. The arm cam latch 704 mechanism is normally attached to the pivot arm 104 and allows the pivot arm 104 to stay up in the locked position using the arm cam latch guide rod 705, which rides in the cam pathway. The wheel 106 is included at the end of the pivot arm 104 in a retracted position.

Figure 8:
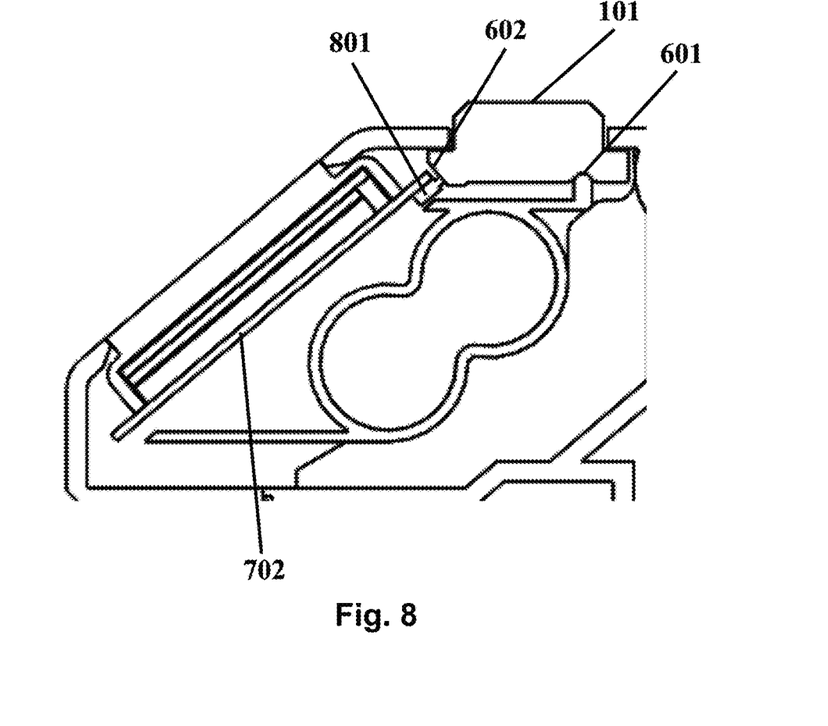
FIG. 8 is a cross sectional view into the right side of the embodiment of FIG. 1, showing positions of the buttons and circuit board.

FIG. 8 is a cross sectional view into the right side of the embodiment of FIG. 1, showing positions of the buttons 101 and circuit board. When a user depresses the input buttons 101, the button assembly pivots about the button pivot point 601 driving the button contact surface 602 into contact with the trigger button assembly 801 which is then relayed to the processor 702 for further interpretation.

Figure 9:
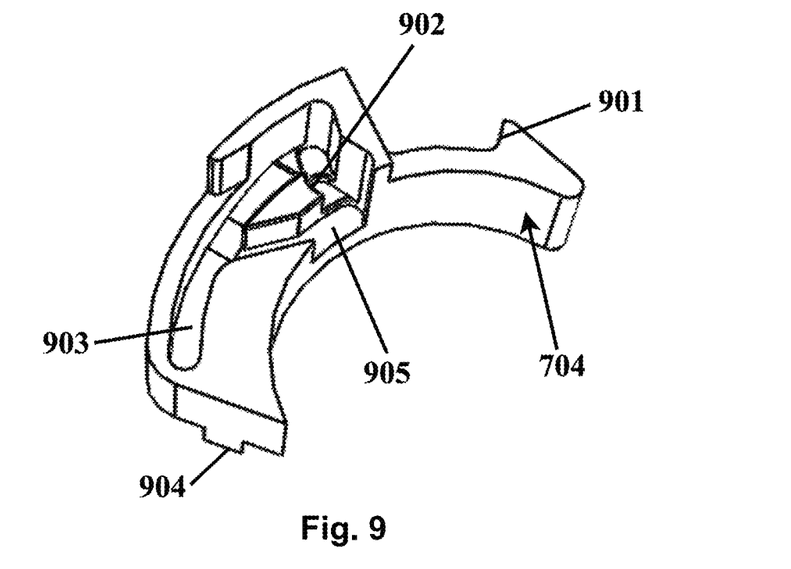
FIG. 9 is a perspective view, seen generally from above, of the arm cam latch of the embodiment of FIG. 1.

FIG. 9 is a perspective view, seen generally from above, of the arm cam latch 704 of the embodiment of FIG. 1. The arm cam latch 704 includes the latch pathway 904, which has a corresponding cutout on the pivot arm 104 and allows for the entire arm cam latch 704 assembly to detach when the breakaway latch 901 is activated and decoupled from the pivot arm 104, so as to protect against damage to the cam latch 704 assembly in the event of misuse. The cam latch guide rod 705 rides in the cam pathway 905. When the pivot arm 104 is in the retracted position, the cam latch guide rod 705 resides in the retention position 902 in the cam pathway. When the pivot arm is extended, the cam latch guide rod 705 is released from the retention position 902 and returns to the extended position trackway 903 on the latch, so as to enable the pivot arm 104 to assume its extended position, in which the wheel 106 comes into contact with the feedstock and is biased against the feedstock.

Figure 10:
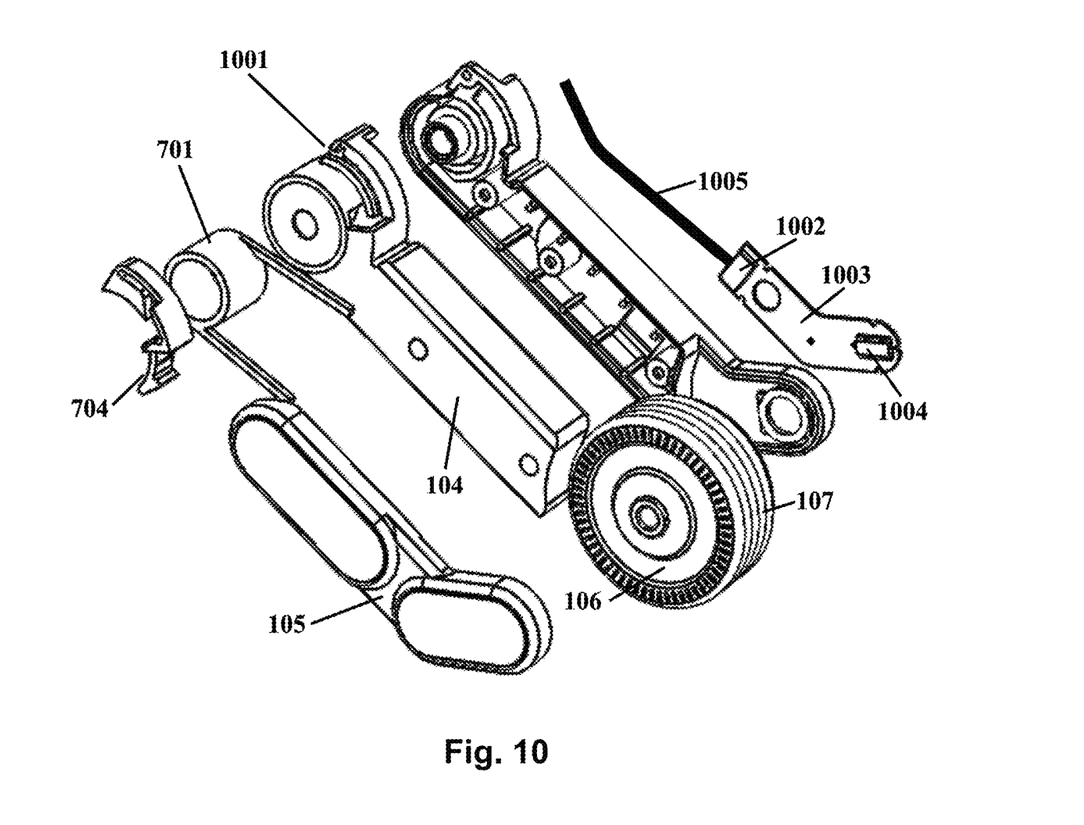
FIG. 10 is an exploded view of the pivot arm of the embodiment of FIG. 1.

FIG. 10 is an exploded view of the pivot arm 104 of the embodiment of FIG. 1. The pivot arm 104 includes several components that together constrain the movement of the wheel 106 and maintain bias against feedstock through the wheel tread 107 of wheel 106. The pivot arm 104 includes a latch pathway cutout 1001 which is mounted against the cam latch 704. The pivot arm 104 additionally contains an encoder 1004 mounted on an encoder board 1003 which connects to the processor 702 through wiring attached to the encoder 1004 through the encoder connector point 1002.

Figure 11:
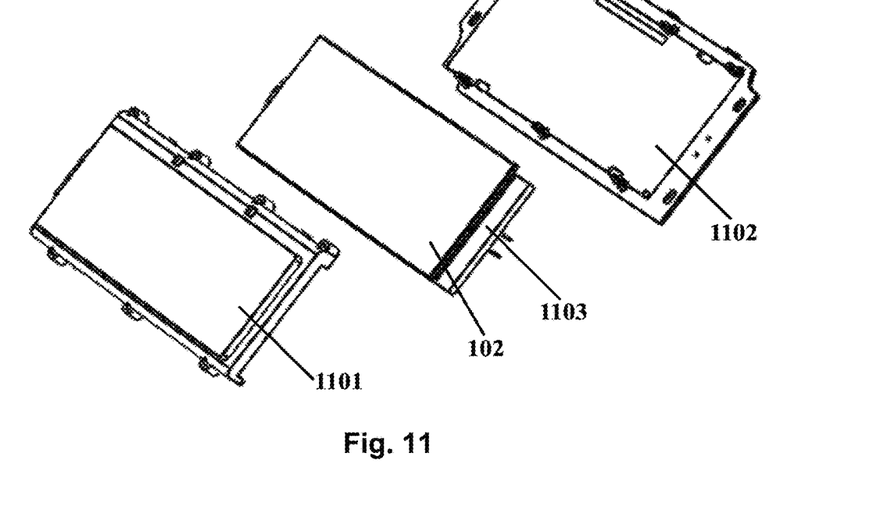
FIG. 11 is an exploded view of the display, backlight, and processor board assembly of the embodiment of FIG. 1.

FIG. 11 is an exploded view of the display 102, backlight 1103, and control board 1102 of the embodiment of FIG. 1. The screen cover 1101 is a protective polymer based part that protects the display 102 from damage. Optionally, the screen cover 1101 has a coating, such as an anti-reflective coating. The display 102 can be mounted to the control board 1102 which includes the processor 702.

Figure 12:
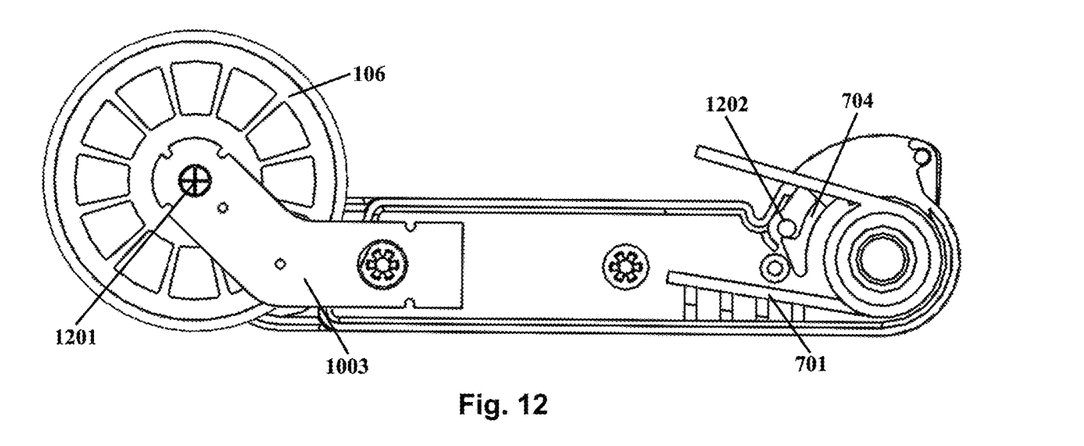
FIG. 12 is a cross sectional view, seen through the rear, of the pivot arm and latch release mechanism of the embodiment of FIG. 1.

FIG. 12 is a cross sectional view, seen through the rear, of the pivot arm 104 and latch release mechanism of the embodiment of FIG. 1. The wheel pivot 1201 of wheel 106 is constrained by the pivot arm 104 and enables the wheel to move in rotary motion. The breakaway latch retention post 1202 interfaces with the cam latch 704 under normal conditions; however, the latch retention post 1202 may lose contact with the cam latch 704 if the pivot arm 104 is extended incorrectly, but such loss of contact does not damage the device.

Figure 13:
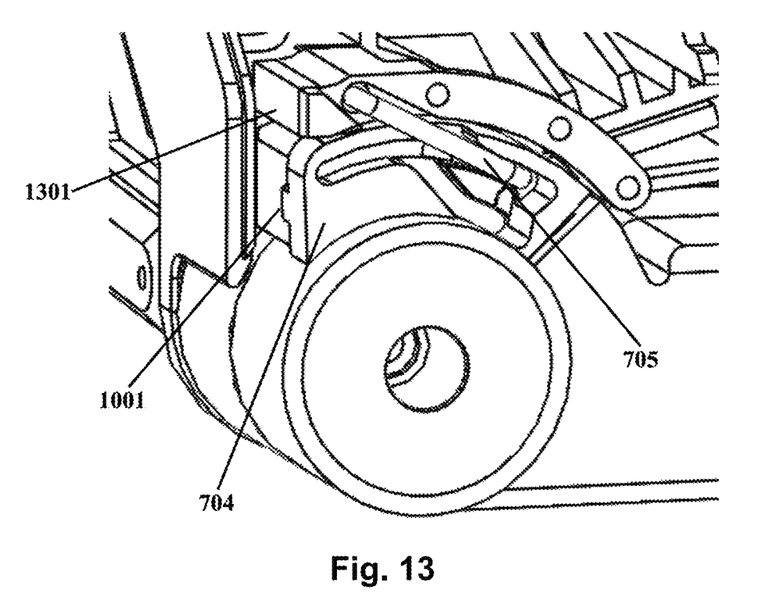
FIG. 13 is a perspective view (with portions in cross section, as seen primarily from the left side), of the pivot arm latching and release mechanism of the embodiment of FIG. 1.

FIG. 13 is a perspective view (with portions in cross section, as seen primarily from the left side), of the pivot arm 104 latching and release mechanism of the embodiment of FIG. 1. The guide rod holder 1301 is mounted to the body 103 and enables the cam latch guide rod 705 to secure the pivot arm 104 through the cam latch 704.

Figure 14:
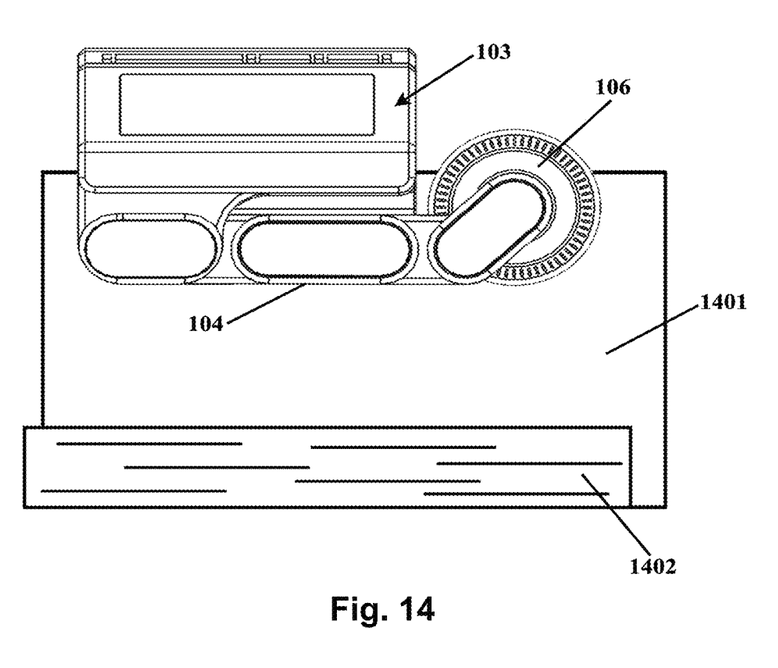
FIG. 14 is a diagram of the embodiment of FIG. 1, showing the embodiment mounted on a tool with the pivot arm in a retracted position.

FIG. 14 is a diagram of the embodiment of FIG. 1, showing the embodiment mounted on a tool 1401 with the pivot arm 104 in a retracted position. The body 103 is mounted and secured against a vertical tool member 1401 with feedstock 1402 underneath the vertical tool member 1401.

Figure 15:
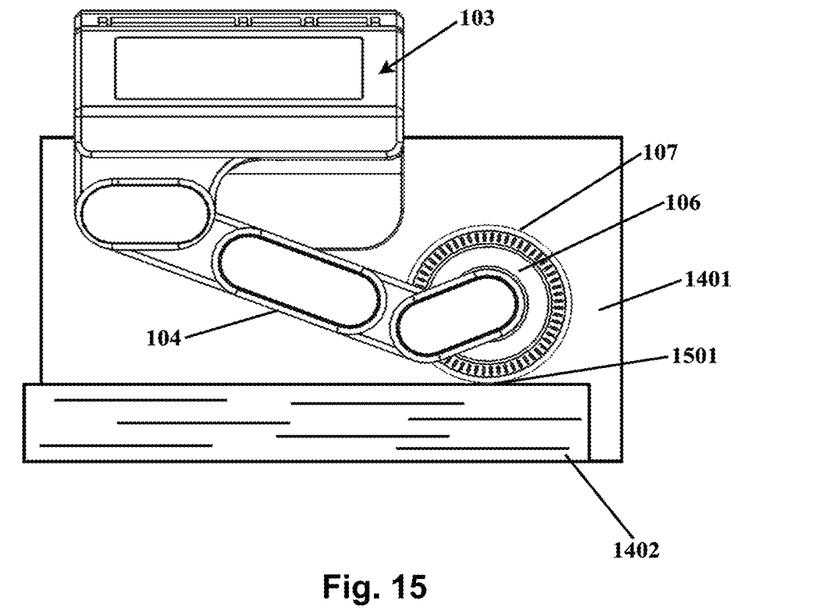
FIG. 15 is a diagram of the embodiment of FIGS. 1 and 14, showing the embodiment mounted on the tool with the pivot arm extended and biased against feedstock.

FIG. 15 is a diagram of the embodiment of FIGS. 1 and 14, showing the embodiment mounted on the tool 1401 with the pivot arm 104 extended and biased against feedstock 1402. The feedstock 1402 is free to move underneath the wheel 106 which is rigidly held against the tool vertical member 1401. The wheel tread 107 is biased against the feedstock 1402 at the biasing interface 1501.

Figure 16:
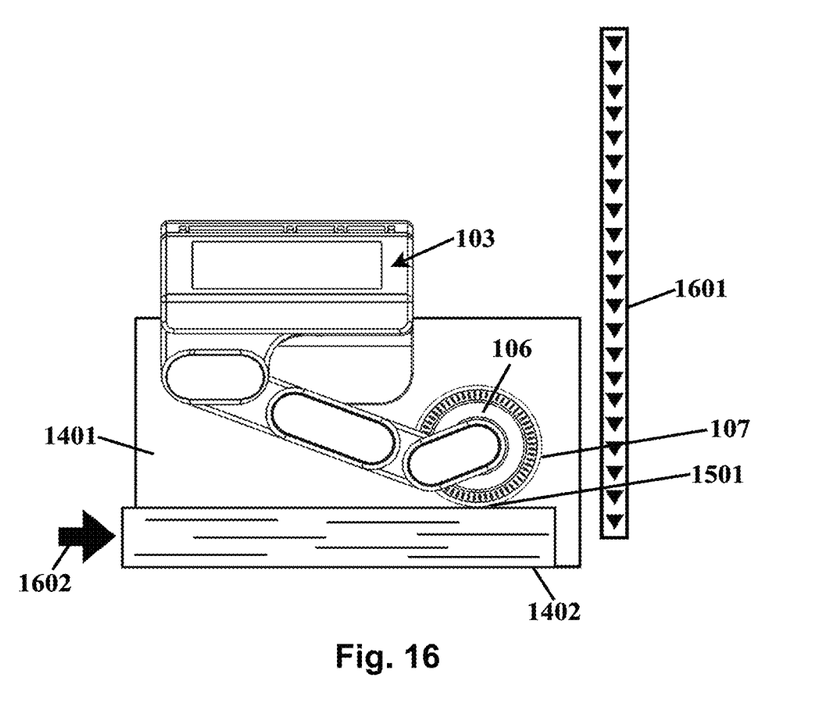
FIG. 16 is a diagram of the embodiment of FIGS. 1 and 14, showing the device of the embodiment mounted to the tool with feedstock rolling under the pivot arm towards a fixed zeroing position.

FIG. 16 is a diagram of the embodiment of FIGS. 1 and 14, showing the device of the embodiment mounted to the tool 1401 with feedstock 1402 rolling under the wheel 106 towards a fixed zeroing position. The feedstock 1402 is approaching, from the direction of feedstock travel indicator 1602, towards a cutting instrument 1601. The pivot arm 104 is biasing the wheel against the feedstock 1501 and is tracking the motion of the feedstock. The body 103 is rigidly held to the vertical tool member 1401 with the wheel tread 107 in contact with the feedstock 1402.

Figure 17:
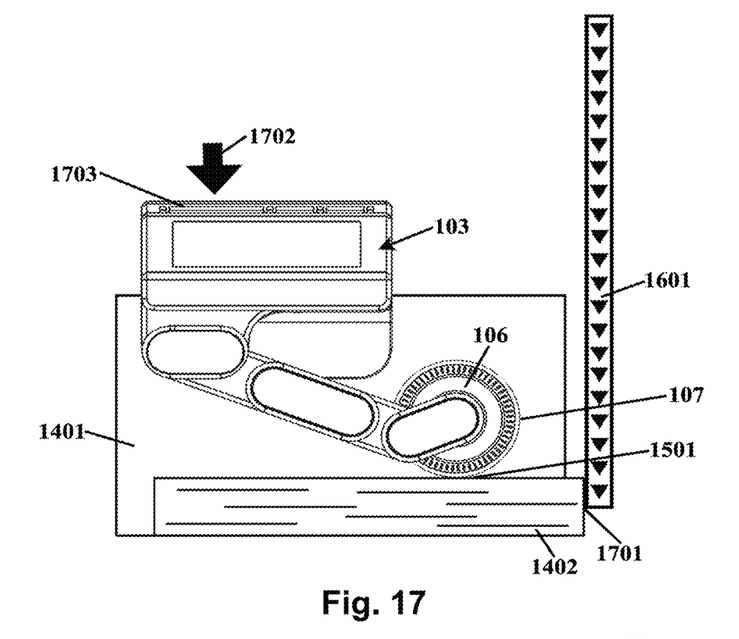
FIG. 17 is a diagram of the embodiment of FIGS. 1 and 14, showing the device of the embodiment mounted to the tool with feedstock rolling under the pivot arm making contact with the fixed zeroing position.

FIG. 17 is a diagram of the embodiment of FIGS. 1 and 14, showing the device of the embodiment mounted to the tool 1401 with feedstock 1402 rolling under the pivot arm 104 making contact with the fixed zeroing position. The display 102 displays a linear measurement of the length of the feedstock 1402. Once the feedstock 1402 has made contact at location 1701 with the cutting instrument 1601, a user provides input confirmation of the feedstock location and presses (indicated by arrow 1702) a zeroing button 1703 indicating the event to the processor 702 and resetting the length of the feedstock 1402 that is displayed in the display 102 to a negative offset quantity stored by the processor 702. The stored negative offset quantity may correspond to the thickness of the blade or cutting instrument 1601.

Figure 18:
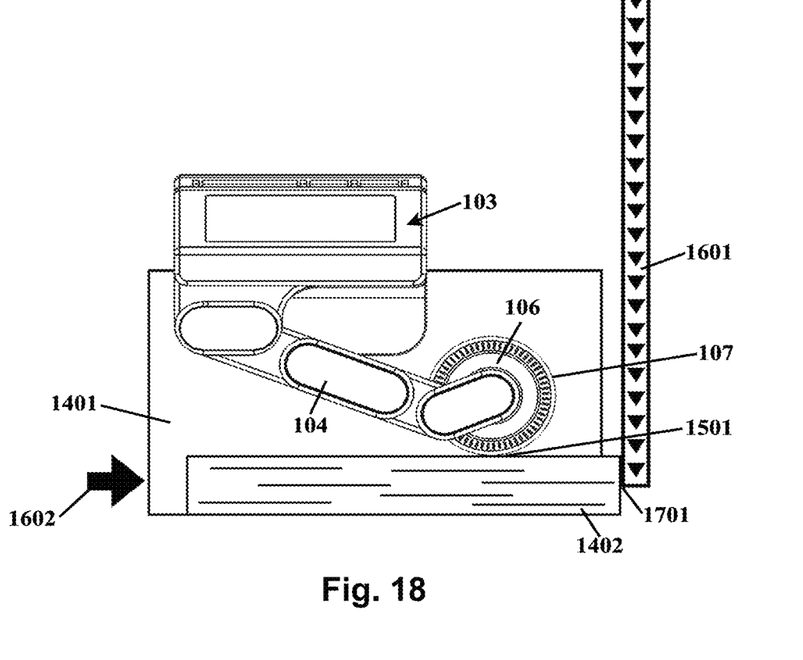
FIG. 18 is a diagram of the embodiment of FIGS. 1 and 14, illustrating a method for determining the thickness of a blade or cutting instrument with the feedstock in contact with one point of a zeroing element.

FIG. 18 is a diagram of the embodiment of FIGS. 1 and 14, illustrating a method for determining the thickness of a blade or cutting instrument 1601 with the feedstock 1402 in contact with one point 1701 of a zeroing element. The feedstock 1402 movement towards the cutting instrument 1601 is indicated by the direction of travel arrow 1602. The interface between the feedstock 1402 and the cutting instrument 1601 is indicated by the contact interface 1701.

Figure 19:
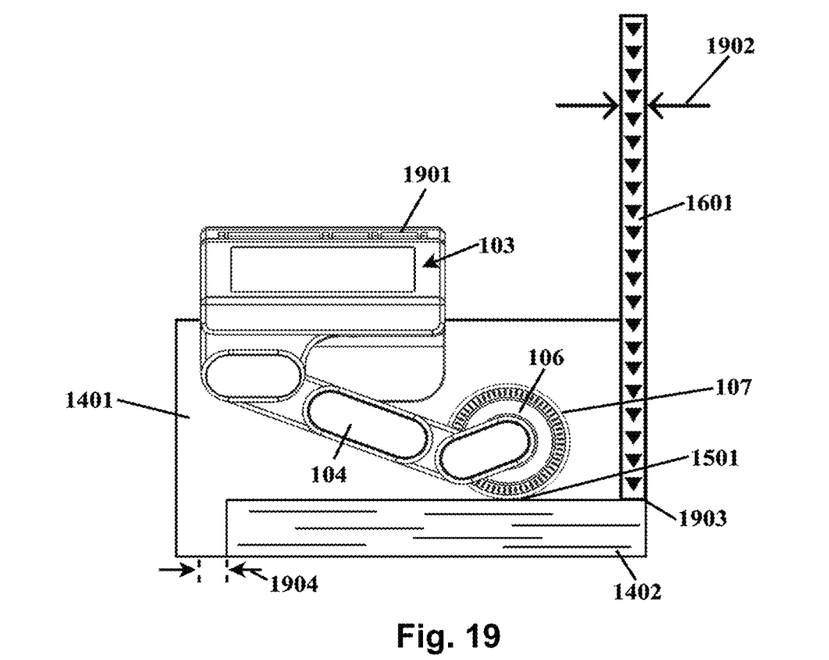
FIG. 19 is a diagram of the embodiment of FIGS. 1 and 14, further illustrating the method for determining the thickness of the blade or cutting instrument with the feedstock in contact with the opposite point on the zeroing element.
Figure 25:
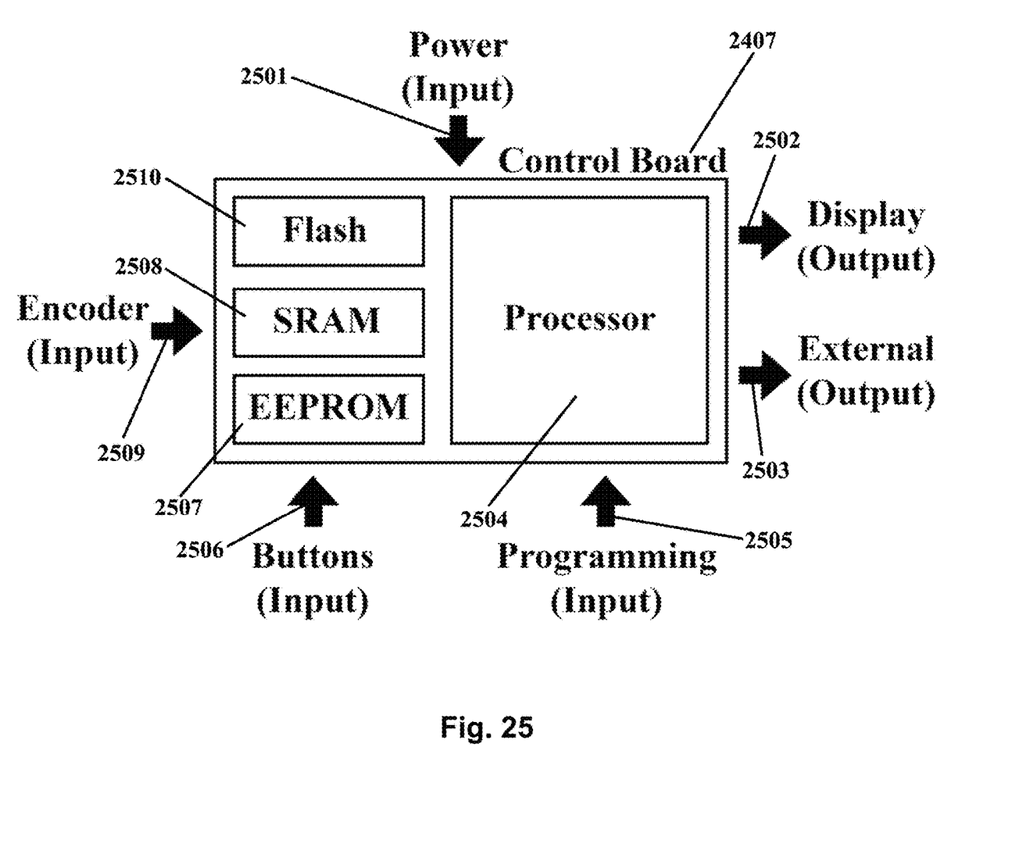
FIG. 25 is a block diagram of the system control board of the embodiment of FIG. 1 and FIG. 24.

FIG. 19 is a diagram of the embodiment of FIGS. 1 and 14, further illustrating the method for determining the thickness of the blade or cutting instrument 1601 with the feedstock 1402 in contact with the opposite point on the zeroing element. Once the feedstock 1402 is moved a desired distance to the opposite side of the cutting instrument 1601, the user selects the confirmation button 1901, indicating to the processor 702 when the measurement should be recorded. The distance 1904 the feedstock 1402 traveled between the position indicated in the diagram of the embodiment of FIG. 19 and the current position indicate the cutting instrument thickness 1902 which is stored in onboard memory that includes a member consisting of the group of Flash 2510, SRAM 2508, or EEPROM 2507, or combinations thereof, as shown in FIG. 25. The location of the feedstock 1402, when the feedstock 1402 is aligned with the front of the cutting instrument 1601, is indicated by the front flush location 1903.

Figure 20:
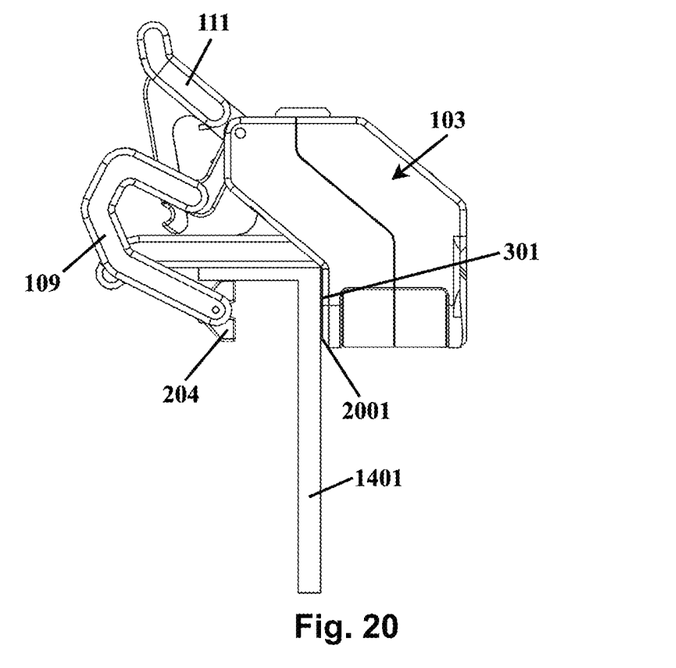
FIG. 20 is a side view of the embodiment of FIG. 1 resting on a tool with the clamp in the open position.

FIG. 20 is a side view of the embodiment of FIG. 1 resting on a tool 1401 with the clamp in the open position. The anvil surface 301 is in contact with the tool vertical member 1401 at the benching interface 2001 of the tool, which constrains some degrees of freedom of the body 103.

Figure 21:
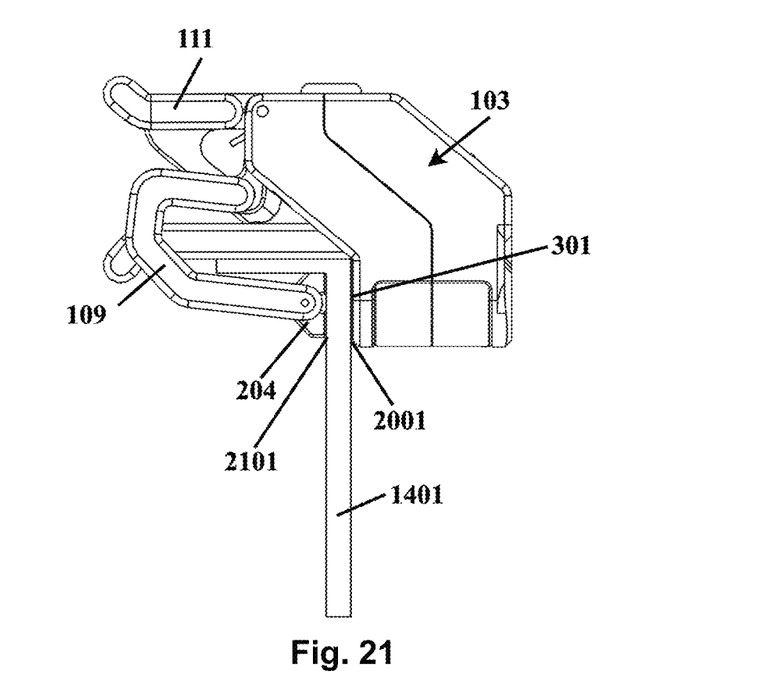
FIG. 21 is a side view of the embodiment of FIG. 1 resting on a tool with the clamp in the closed position so as to removably secure the embodiment to the tool.

FIG. 21 is a side view of the embodiment of FIG. 1 located on a tool 1401 with the clamp in the closed position so as to removably secure the embodiment to the tool 1401. The body 103 is rigidly coupled to the vertical tool member 1401 and enables the pivot arm 104 to be extended and to bias the wheel 106 against feedstock 1402 beneath the wheel 106. The clamp feet 204 are secured to the vertical tool member 1401 at the feet contact interface 2101, securing the body 103 to the tool.

Figure 22:
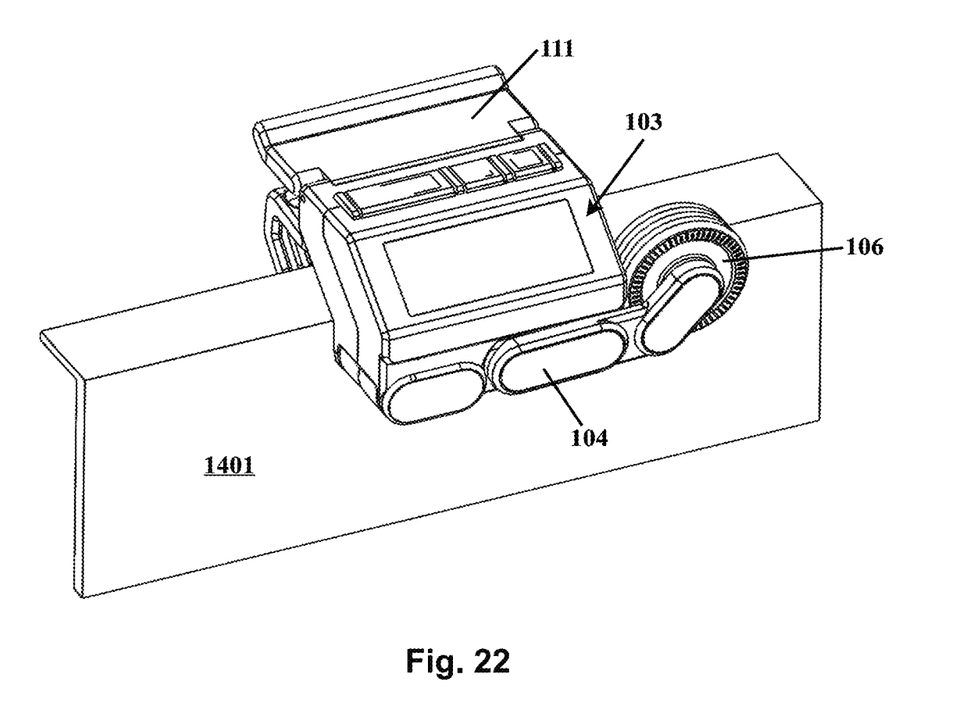
FIG. 22 is an isometric view of the embodiment of FIGS. 1 and 21 secured to the tool.

FIG. 22 is an isometric view of the embodiment of FIGS. 1 and 21 secured to the tool 1401. The pivot arm 104 is in the retracted position and the clamp has secured the body 103 rigidly to the vertical tool member 1401. The clamp arm 111 holds the device in place while in the secure position on the vertical tool member 1401.

Figure 23:
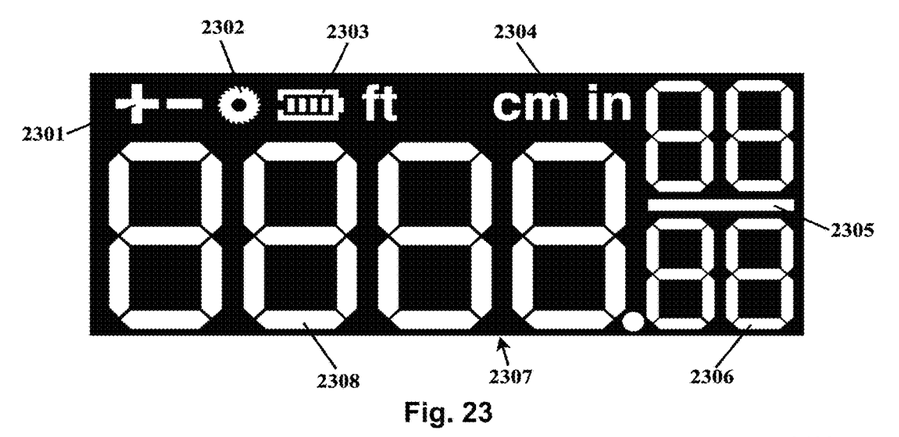
FIG. 23 is illustrates an embodiment of the graphical display of the embodiment of FIG. 1.

FIG. 23 illustrates an embodiment of the graphical display 2307 of the embodiment of FIG. 1. The numerical primary digits 2308 display non-fractional and non-decimal place digits of a given linear measurement of a length of the feedstock 1402. The numerical secondary digits 2306 display fractional 2305 or post decimal digits of a given linear measurement. The positive and negative indication icons 2301 highlight the direction (1602 of FIG. 16 and FIG. 18) the feedstock 1402 is moving in. The cutting instrument offset indicator 2302 indicates when the compensation is being applied to a measurement. The power indicator 2303 highlights the power supply and amount the device has available. The units of measurement icon 2304 indicates what type of linear measurement units are being represented by the display 2307, such as inches, feet, or centimeters. The particular type of linear measurement unit is selected by the control buttons 101 and 2404.

Figure 24:
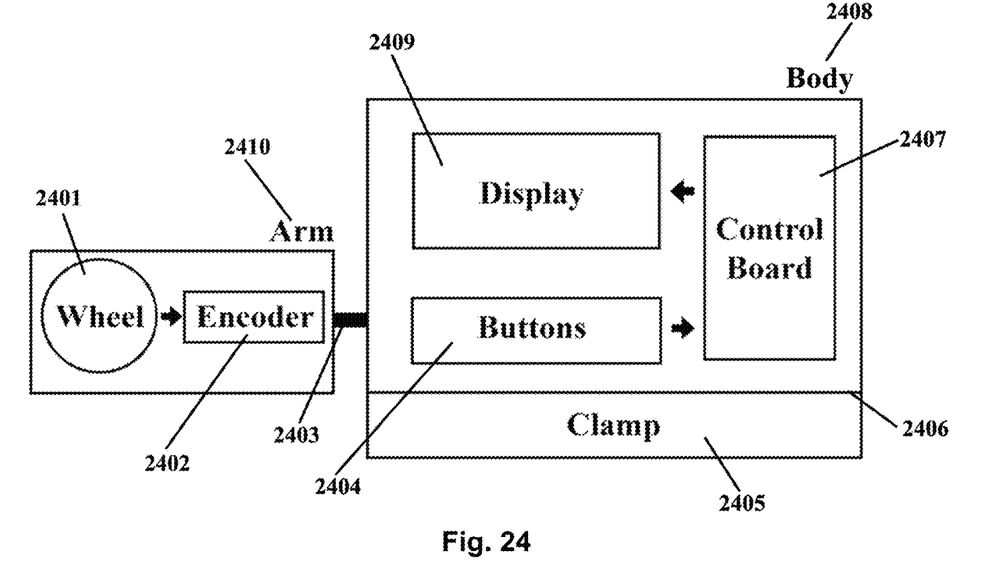
FIG. 24 is a block diagram of the system of the body and the arm assembly used in the embodiment of FIG. 1.

FIG. 24 is a block diagram of the system of the body 2408 and the arm assembly 2410 used in the embodiment of FIG. 1. The body 2408 is the central component of the device and contains a control board 2407 which interprets inputs from buttons 2404 and other external sources and outputs, as a display 2409 shows linear measurements of the feedstock 1402. Attached to the body 2408 is a clamp 2405 which clamps to the body 2408 a vertical member of the tool against a contact surface of the body. Coupled and pivoted at location 2403 relative to the body 2408 is the arm assembly 2410. The arm assembly 2410 contains a measurement wheel 2401 and an encoder 2402 which are biased against feedstock material and indicate to the control board 2407 linear movement of the feedstock.

FIG. 25 is a block diagram of the system control board 2407 of the embodiment of FIG. 1 and FIG. 24. The control board 2407 includes an electronic circuit board containing a processor 2504 for determining what to output based on a series of inputs, flash memory 2510, where the program for device operation is stored, SRAM 2508, where the program stores variables, and the EEPROM 2507, for long term storage of items that are saved. The encoder 2509 provides rotary signal interpreted from wheel movement. The buttons 2506 allow user input based on a given action they chose to take. The programming input 2505 is an interface for receiving files or other information to be stored on the device, such as for calibration, factory configuration, and updates. Power 2501 is provided to the control board 2407 by a battery or an external source. The Power 2501 enables the control board 2407 to perform various functions. The control may output information to an external device 2503 or to a display 2502 screen for a user to view and interpret.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A device for measuring length of feedstock being fed along a path to a cutting tool operated by a user, the cutting tool having a blade configured to cut the feedstock in a direction transverse to the path, the device comprising:
   a body, configured to be removably attached to the cutting tool;
   a display, mounted in the body, and visually accessible to the user;
   a measurement wheel mechanically mounted to the body and configured to be mechanically biased to the feedstock under a condition wherein the body is attached to the cutting tool;
   an encoder coupled to the measurement wheel and configured to generate a signal indicative of angular position of the wheel; and
   a processor, disposed in the body, coupled to the encoder and the display and configured to cause the display to indicate a measure corresponding to a length of the feedstock that has been fed along the path to reach the blade of the cutting tool so as to be subject to cutting, at the indicated measure, by the user's operation of the cutting tool.

2. A device according to claim 1, further comprising:
   a pivot arm, configured to be mounted to the body, at a pivot, at a first end of the pivot arm, wherein the measurement wheel is mounted at a second end of the pivot arm; and
   a pivot arm spring mounted in relation to both the pivot arm and the body to bias the pivot arm in a manner as to maintain the measurement wheel engaged against the feedstock.

3. A device according to claim 2, wherein: the pivot arm has a second position in which the measurement wheel is not engaged against the feedstock, and the device further comprises a releasable latch configured to releasably latch the pivot arm in the second position.

4. A device according to claim 1, further comprising:
   a storage system, coupled to the processor, and configured to store parameter data relating to the tool; and
   a zeroing button, coupled to the processor, the zeroing button configured by the processor, under a condition wherein the feedstock has abutted the blade of the tool, to reset the measure in the display to facilitate determination of the length of the feedstock thereafter fed to the tool.

5. A device according to claim 4, wherein the storage system is configured to store a quantity corresponding to a thickness of the blade in the tool, and the zeroing button is configured by the processor to reset the measure in the display to a negative offset corresponding to the stored quantity.

6. A device according to claim 5, wherein the negative offset is user-configurable.

7. A device according to claim 1, further comprising a clamp, coupled to the body, configured to removably attach the body to the tool.

8. A device according to claim 7, wherein the tool has an approximately vertical member and the clamp is configured to mount the body on the approximately vertical member, the clamp including a clamp handle pivotally attached to the body, a linkage system coupled to the clamp handle and including a set of clamp arms, a set of clamp feet pivotally attached to the set of clamp arms and configured, in response to a downward force applied to the clamp handle, to compressively engage the vertical member against a contact surface of the body, so that the vertical member is clamped between the set of clamp feet and the contact surface of the body.

* * * * *